US011227564B2

(12) United States Patent
Zhai

(10) Patent No.: US 11,227,564 B2
(45) Date of Patent: Jan. 18, 2022

(54) PROCESSING METHOD, DEVICE AND STORAGE MEDIUM FOR EYE PROTECTION MODE

(71) Applicant: BEIJING XIAOMI MOBILE SOFTWARE CO., LTD., Beijing (CN)

(72) Inventor: Dong Zhai, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/033,860

(22) Filed: Sep. 27, 2020

(65) Prior Publication Data

US 2021/0248974 A1   Aug. 12, 2021

(51) Int. Cl.
| | |
|---|---|
| *G09G 5/02* | (2006.01) |
| *G09G 5/10* | (2006.01) |
| *H04N 9/64* | (2006.01) |
| *H04N 9/69* | (2006.01) |
| *H04N 9/73* | (2006.01) |
| *H04N 9/77* | (2006.01) |

(52) U.S. Cl.
CPC ............. *G09G 5/02* (2013.01); *G09G 5/10* (2013.01); *G09G 2320/0666* (2013.01)

(58) Field of Classification Search
CPC combination set(s) only.
See application file for complete search history.

(56) References Cited

U.S. PATENT DOCUMENTS

| | | | |
|---|---|---|---|
| 2014/0333655 A1 | 11/2014 | Tu | |
| 2015/0070337 A1 | 3/2015 | Bell et al. | |
| 2018/0137837 A1 | 5/2018 | Peana et al. | |
| 2019/0025589 A1* | 1/2019 | Haddick | G02B 27/0018 |
| 2020/0312274 A1 | 10/2020 | Li et al. | |

FOREIGN PATENT DOCUMENTS

CN    109995942 A    7/2019

OTHER PUBLICATIONS

Extended European Search Report in Application No. 20196197.6, dated Mar. 10, 2021.

* cited by examiner

*Primary Examiner* — Wesner Sajous
(74) *Attorney, Agent, or Firm* — Syncoda LLC; Feng Ma

(57) ABSTRACT

A processing method for an eye protection mode can be applied to a mobile terminal and include: acquiring a preset eye protection value, the preset eye protection value being a preset color temperature value of a white point; determining an eye protection coefficient of the preset eye protection value based on an application environment of the mobile terminal, and obtaining an optimized eye protection value based on the eye protection coefficient and the preset eye protection value, the optimized eye protection value being an eye protection color temperature value of the white point; determining eye protection color coordinates of the white point based on the optimized eye protection value and a daylight-blackbody locus curve; and determining RGB values of all color nodes based on the eye protection color coordinates of the white point through a color conversion matrix.

13 Claims, 8 Drawing Sheets

PROCESSING METHOD, DEVICE AND STORAGE MEDIUM FOR EYE PROTECTION MODE

CROSS-REFERENCE TO RELATED APPLICATION

This application claims priority to Chinese Patent Application No. 202010089324.2, filed on Feb. 12, 2020, the disclosure of which are hereby incorporated by reference in its entirety.

BACKGROUND

Many terminals, such as computers, mobile terminals, etc. employ various types of display screens for displaying content to users. The displays can be, for example, liquid-crystal displays (LCDs), organic light-emitting diode (OLED) displays, etc. The display screens may make users' eyes feel fatigued.

SUMMARY

Various embodiments of the present disclosure provide a processing method, device, and storage medium for an eye protection mode.

According to a first aspect of embodiments of the present disclosure, a processing method for an eye protection mode is provided. The processing method is applied to a mobile terminal and includes: acquiring a preset eye protection value, the preset eye protection value being a preset color temperature value of a white point; determining an eye protection coefficient of the preset eye protection value based on an application environment of the mobile terminal, and obtaining an optimized eye protection value based on the eye protection coefficient and the preset eye protection value, the optimized eye protection value being an eye protection color temperature value of the white point; determining eye protection color coordinates of the white point based on the optimized eye protection value and a daylight-blackbody locus curve; and determining RGB values of all color nodes based on the eye protection color coordinates of the white point through a color conversion matrix.

In some embodiments, the eye protection coefficient includes one or any combination of the following: a first eye protection coefficient, a second eye protection coefficient, and a third eye protection coefficient.

In another embodiment, the first eye protection coefficient is determined based on environmental light intensity, and the first eye protection coefficient is negatively correlated to the environmental light intensity.

In yet another embodiment, the first eye protection coefficient is determined based on the environmental light intensity by: determining a negative correlation curve of environmental light intensity and first eye protection coefficient based on a positive correlation curve of environmental light intensity and grayscale value through a conversion relationship; and determining the first eye protection coefficient corresponding to the environmental light intensity based on the environmental light intensity and the negative correlation curve of environmental light intensity and first eye protection coefficient.

In yet another embodiment, the negative correlation curve of environmental light intensity and first eye protection coefficient is determined based on a positive correlation curve of environmental light intensity and grayscale value through a conversion relationship: acquiring a preset number of environmental light intensity values of different light intensities and grayscale values of grayscales above four grayscales corresponding to the environmental light intensity values, and fitting the positive correlation curve of environmental light intensity and grayscale value; obtaining the negative correlation curve of environmental light intensity and first eye protection coefficient based on the positive correlation curve of environmental light intensity and grayscale value, so that a sum of a grayscale value, which is determined for any environmental light intensity based on the positive correlation curve of environmental light intensity and grayscale value, and the first eye protection coefficient, which is determined for the environmental light intensity based on the negative correlation curve of environmental light intensity and first eye protection coefficient, is 1.

In another embodiment, a geographic location of the mobile terminal is acquired, and the second eye protection coefficient is determined based on the geographic location.

In yet another embodiment, the second eye protection coefficient is determined based on the geographic location by: determining latitude information of the geographic location where the mobile terminal is located based on the geographic location; determining an optimal color temperature value of the white point corresponding to the latitude information based on the latitude information; and obtaining the second eye protection coefficient based on a ratio of the optimal color temperature value of the white point and the preset eye protection value.

In another embodiment, the second eye protection coefficient is determined based on the geographic location by: determining whether the mobile terminal is located within a preset area based on the geographic location of the mobile terminal; and determining that the second eye protection coefficient is a preset eye protection coefficient value when the mobile terminal is located within the preset area.

In yet another embodiment, the third eye protection coefficient is determined based on user's habits.

In another embodiment, before acquiring a preset eye protection value, the processing method for an eye protection mode further includes: determining whether the mobile terminal initiates an application in a list of applications with disabled eye protection mode; determining that the eye protection coefficient is a preset value or disabling the eye protection mode when an application in the list is initiated; and proceeding to the step of acquiring a preset eye protection value when an application in the list is not initiated.

In another embodiment, eye protection color coordinates of the white point is determined based on the optimized eye protection value and a daylight-blackbody locus curve by: the daylight-blackbody locus curve including a daylight locus curve and a blackbody locus curve; determining whether the daylight-blackbody locus curve is the daylight locus curve or the blackbody locus curve based on a current time, where the current time includes a current date and a current time point; and determining the eye protection color coordinates of the white point based on the optimized eye protection value and either the daylight locus curve or the blackbody locus curve.

According to a second aspect of the embodiments of the present disclosure, a processing device for an eye protection mode is provided. The processing device is applied to a mobile terminal and includes: a preset eye protection value acquisition module, configured to acquire a preset eye protection value, the preset eye protection value being a preset color temperature value of a white point; an eye protection coefficient determination module, configured to determine an eye protection coefficient of the preset eye protection value based on an application environment of the mobile terminal; an optimized eye protection value determination module, configured to get an optimized eye protection value based on the eye protection coefficient and the preset eye protection value, the optimized eye protection value being an eye protection color temperature value of the white point; an eye protection color coordinate determination module, configured to determine eye protection color coordinates of the white point based on the optimized eye protection value and a daylight-blackbody locus curve; and a RGB value determination module, configured to determine RGB values of all color nodes based on the eye protection color coordinates of the white point through a color conversion matrix.

In some embodiments, the eye protection coefficient includes one or any combination of the following: a first eye protection coefficient, a second eye protection coefficient, and a third eye protection coefficient.

In another embodiment, the eye protection coefficient determination module is configured to: determine the first eye protection coefficient based on environmental light intensity, and the first eye protection coefficient is negatively correlated to the environmental light intensity.

In yet another embodiment, the eye protection coefficient determination module is configured to: determine a negative correlation curve of environmental light intensity and first eye protection coefficient based on a positive correlation curve of environmental light intensity and grayscale value through a conversion relationship; and determine the first eye protection coefficient corresponding to the environmental light intensity based on the environmental light intensity and the negative correlation curve of environmental light intensity and first eye protection coefficient.

In still another embodiment, the eye protection coefficient determination module is configured to: acquire a preset number of environmental light intensity values of different light intensities and grayscale values of grayscales above four grayscales corresponding to the environmental light intensity values, and fit the positive correlation curve of environmental light intensity and grayscale value; acquire the negative correlation curve of environmental light intensity and first eye protection coefficient based on the positive correlation curve of environmental light intensity and grayscale value, so that a sum of a grayscale value, which is determined for any environmental light intensity based on the positive correlation curve of environmental light intensity and grayscale value, and the first eye protection coefficient, which is determined for the environmental light intensity based on the negative correlation curve of environmental light intensity and first eye protection coefficient, is 1.

In yet another embodiment, the eye protection coefficient determination module is configured to: acquire a geographic location of the mobile terminal, and determine the second eye protection coefficient based on the geographic location.

In yet another embodiment, the eye protection coefficient determination module is configured to: determine latitude information of the geographic location where the mobile terminal is located based on the geographic location; determine an optimal color temperature value of the white point corresponding to the latitude information based on the latitude information; and acquire the second eye protection coefficient based on a ratio of the optimal color temperature value of the white point and the preset eye protection value.

In yet another embodiment, the eye protection coefficient determination module is configured to: determine whether the mobile terminal is located within a preset area based on the geographic location of the mobile terminal; and determine that the second eye protection coefficient is a preset eye protection coefficient value when the mobile terminal is located within the preset area.

In another embodiment, the eye protection coefficient determination module is configured to: determine the third eye protection coefficient based on user's habits.

In another embodiment, the preset eye protection value acquisition module is further configured to: determine whether the mobile terminal initiates an application in a list of applications where an eye protection mode is disabled; determine that the eye protection coefficient is a preset value or disable the eye protection mode when an application in the list is initiated; and proceed to the step of acquiring a preset eye protection value when an application in the list is not initiated.

In another embodiment, the daylight-blackbody locus curve includes a daylight locus curve and a blackbody locus curve. The eye protection color coordinate determination module is configured to: determine the daylight-blackbody locus curve as the daylight locus curve or the blackbody locus curve based on a current time, where the current time includes a current date and a current time point; and determine the eye protection color coordinates of the white point based on the optimized eye protection value and either the daylight locus curve or the blackbody locus curve.

According to a third aspect of the embodiments of the present disclosure, a processing device for an eye protection mode is provided, including: a memory configured to store instructions; and a processor configured to call the instructions to perform the processing method for an eye protection mode described in the first aspect or in any embodiment of the first aspect.

According to a fourth aspect of the embodiments of the present disclosure, a non-transitory computer-readable storage medium having computer-executable instructions stored thereon. When the computer-executable instructions are executed by a processor, the processing method for an eye protection mode described in the first aspect or in any embodiment of the first aspect is performed.

The technical solutions provided by the embodiments of the present disclosure may include the following beneficial effects: in the processing method for an eye protection mode provided by the present disclosure, the optimized eye protection value is obtained by acquiring the preset eye protection value and the eye protection coefficient, and the eye protection color coordinates of the white point are determined based on the optimized eye protection value. Since the eye protection coefficient varies according to different scenarios, an appropriate eye protection value is given for the determined eye protection color coordinates of the white point after considering various scenarios and conditions, which improves the user's experience and comfort.

It should be noted that the above general description and the following detailed description are merely exemplary and explanatory and should not be construed as limiting of the disclosure.

BRIEF DESCRIPTION OF THE DRAWINGS

The accompanying drawings, which are incorporated and constitute a part of the disclosure, show exemplary embodiments of the present disclosure. The drawings along with the specification explain the principles of the present disclosure.

DETAILED DESCRIPTION

Exemplary embodiments will be described in detail herein, examples of which are illustrated in the accompanying drawings. The following description refers to the same or similar elements in the different figures unless otherwise indicated. The embodiments described in the following exemplary embodiments do not represent all embodiments consistent with the present invention. Instead, they are merely examples of devices and methods consistent with aspects of the present invention as detailed in the appended claims.

In different scenarios, users may have different requirements for an eye protection mode of a mobile terminal. However, current eye protection modes in mobile terminals are typically fixed and will not change with an external environment.

Various embodiments of the present disclosure can improve users' experience and comfort levels, by providing more intelligent processing methods for eye protection modes.

A processing method for an eye protection mode provided by the present disclosure realizes that an appropriate eye protection value is provided for the user by adjusting an eye protection coefficient based on different application environments of the mobile terminal, which improves the user's experience and comfort.

Figure 1:
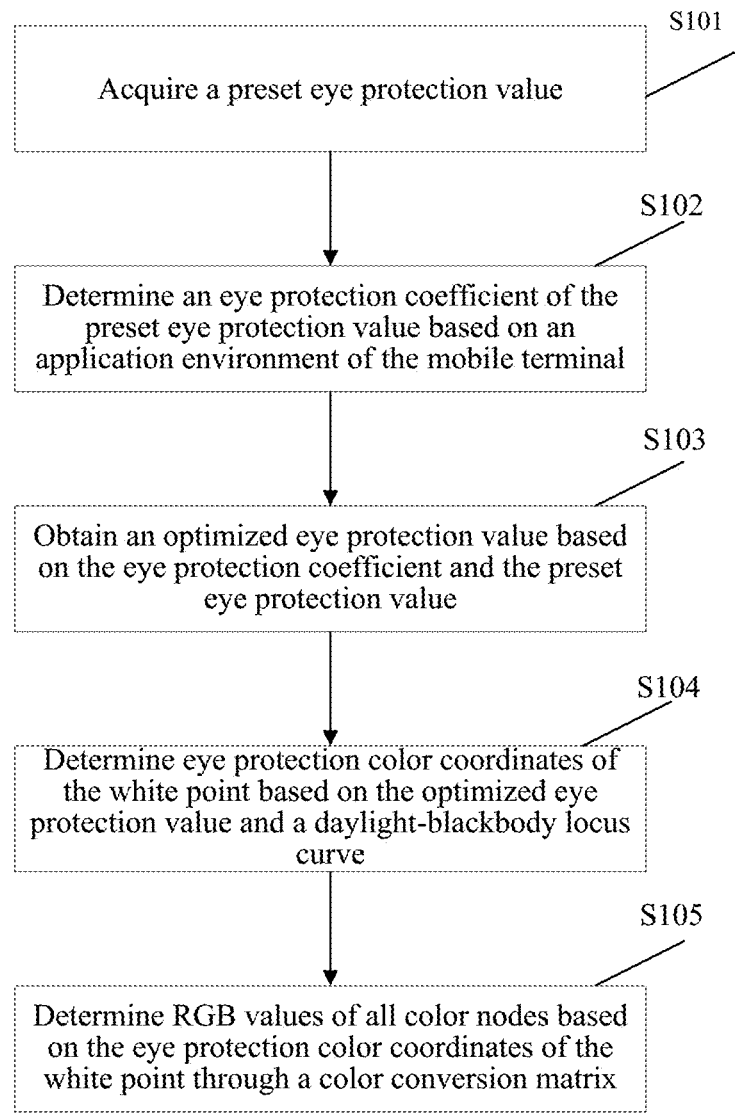
FIG. 1 is a flowchart of a processing method for an eye protection mode according to some embodiments of the present disclosure.

FIG. 1 is a flowchart of a processing method for an eye protection mode according to some embodiments of the present disclosure.

As shown in FIG. 1, a processing method for an eye protection mode provided by the present disclosure includes step S101, step S102, step S103, step S104, and step S105. The following will introduce step S101, step S102, step S103, step S104, and step S105, respectively.

In step S101, a preset eye protection value is acquired.

The preset eye protection value is a preset color temperature value of a white point. The white point is a pixel point with values of R, G and B being 255.

The preset eye protection value may be a color temperature value of the white point automatically recommended by the system, for example, a color temperature value of 6500 K, or a color temperature value of the white point set by the user according to the user's actual situation.

In step S102, an eye protection coefficient of the preset eye protection value is determined based on an application environment of the mobile terminal.

The eye protection coefficient is used to adjust the preset eye protection value, so that the adjusted preset eye protection value is suitable for the application environment of the mobile terminal.

The eye protection coefficient can be different according to different application environments of the mobile terminal, so that an appropriate eye protection value is given for the determined eye protection color coordinates of the white point after considering various scenarios and conditions, which improves the user's experience and comfort.

The eye protection coefficient may vary depending on the applications initiated on the mobile terminal.

The eye protection coefficient can vary according to the environmental light intensity.

The eye protection coefficient can vary according to the use time.

The eye protection coefficient may vary according to the location where the mobile terminal is located.

The eye protection coefficient can also vary according to the age of the user.

In step S103, based on the eye protection coefficient and the preset eye protection value, an optimized eye protection value is obtained.

The optimized eye protection value is an eye protection color temperature value of the white point. The optimized eye protection value is an adjusted preset eye protection value suitable for the application environment according to different application environments of the mobile terminal.

In step S104, based on the optimized eye protection value and a daylight-blackbody locus curve, eye protection color coordinates of the white point are determined.

The color coordinates of the white point corresponding to the color temperature value of the white point can be determined through the daylight-blackbody locus curve. Based on the optimized color temperature value of the white point, that is, the optimized eye protection value, the eye protection color coordinates of the white point corresponding to the optimized eye protection value are determined.

In step S105, based on the eye protection color coordinates of the white point, RGB values of all color nodes are determined through a color conversion matrix.

After the color coordinates of the white point are determined, the color coordinates of all color nodes in addition to the white point are also determined correspondingly. Based on the color conversion matrix, RGB values of each color node corresponding to the color coordinates of each color node can be obtained.

By determining the RGB values of each color node, an eye protection effect determined according to the application scenario of the mobile terminal can be obtained on a screen of the mobile terminal.

In the processing method for the eye protection mode provided by the present disclosure, the optimized eye protection value is acquired by acquiring the preset eye protection value and the eye protection coefficient, while the eye protection color coordinates of the white point are determined based on the optimized eye protection value. Since the eye protection coefficient varies according to different scenarios, an appropriate eye protection value is given for the determined eye protection color coordinates of the white point after considering various scenarios and conditions, which improves the user's experience and comfort.

In some embodiments of the present disclosure, the eye protection coefficient includes one or any combination of the following: a first eye protection coefficient, a second eye protection coefficient, and a third eye protection coefficient.

In some embodiments of the present disclosure, the eye protection coefficient is determined by the first eye protection coefficient.

The first eye protection coefficient varies according to the environmental light intensity.

Under an outdoor sunlight mode, the user has low requirements for eye protection. Therefore, the first eye protection coefficient has a negative correlation with the environmental light intensity. The greater the environmental light intensity, the lower the first eye protection coefficient. Further, the lower the eye protection coefficient, the lower the eye protection degree of the eye protection color coordinates of the white point adjusted by the eye protection coefficient, and the lower the eye protection degree of the RGB values of all color nodes determined by the eye protection color coordinates of the white point.

Figure 2:
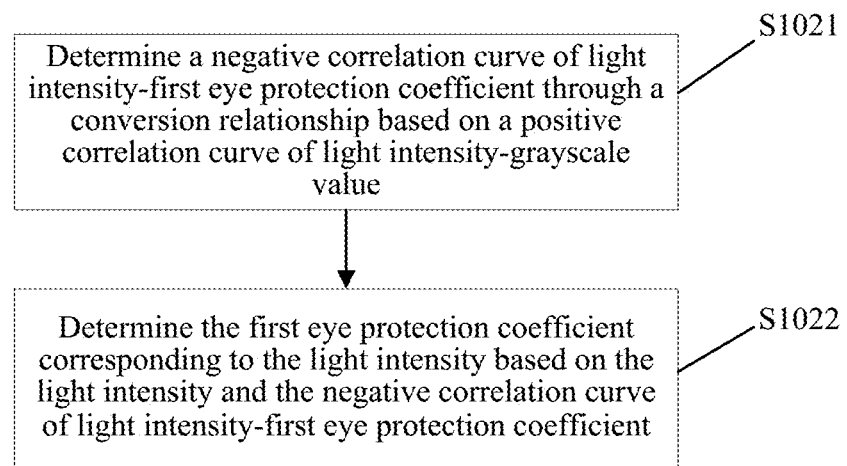
FIG. 2 is a flowchart of determining a first eye protection coefficient in a processing method for an eye protection mode according to some embodiments of the present disclosure.

FIG. 2 is a flowchart of determining a first eye protection coefficient in a processing method for an eye protection mode according to some embodiments of the present disclosure.

As shown in FIG. 2, in some embodiments of the present disclosure, the first eye protection coefficient is determined based on environmental light intensity through step S1021 and step S1022. The steps S1021 and S1022 will be described below, respectively.

In step S1021, based on a positive correlation curve of environmental light intensity and grayscale value, a negative correlation curve of environmental light intensity and first eye protection coefficient is determined through a conversion relationship.

In step S1022, the first eye protection coefficient corresponding to the environmental light intensity is determined based on the environmental light intensity and the negative correlation curve of environmental light intensity and first eye protection coefficient.

In the negative correlation curve of environmental light intensity and first eye protection coefficient, the first eye protection coefficient corresponding to any environmental light intensity can be read.

Figure 3:
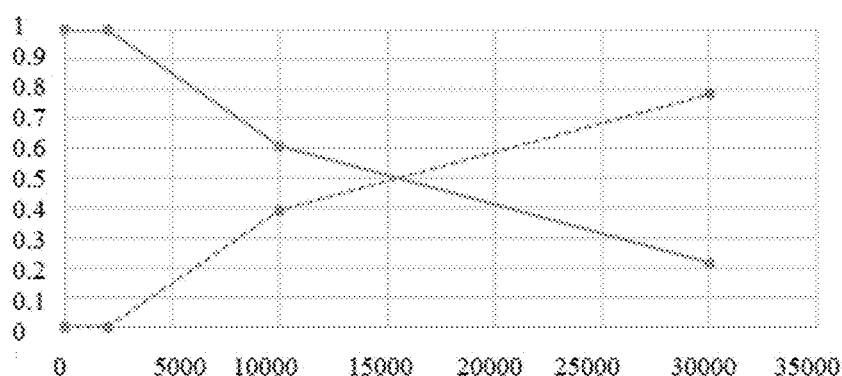
FIG. 3 is a schematic diagram of a negative correlation curve of environmental light intensity and first eye protection coefficient determined in a processing method for an eye protection mode according to some embodiments of the present disclosure.

FIG. 3 is a schematic diagram of a negative correlation curve of environmental light intensity and first eye protection coefficient determined in a processing method for an eye protection mode according to some embodiments of the present disclosure.

As shown in FIG. 3, in some embodiments of the present disclosure, the negative correlation curve of environmental light intensity and first eye protection coefficient is determined through a conversion relationship based on the positive correlation curve of environmental light intensity and grayscale value as follows.

Different environmental light intensity values and grayscale values corresponding to the environmental light intensity values are acquired, to fit the positive correlation curve of environmental light intensity and normalized grayscale value, where the image displayed on the terminal has at least four gray levels.

In some embodiments, the environmental light intensity with the environmental light intensity value 0 Lux, 2000 Lux, 10000 Lux, and 30000 Lux can be selected, and the grayscale values corresponding to the respective environmental light intensity values, which are just visible to the human eye, are acquired based on the respective environmental light intensity values. The positive correlation curve of environmental light intensity and grayscale value is fit through the above four groups (environmental light intensity, grayscale value). The fitted positive correlation curve of the environmental light intensity and normalized grayscale value is shown by the dotted line in FIG. 3.

The negative correlation curve of environmental light intensity and first eye protection coefficient is obtained based on the positive correlation curve of environmental light intensity and grayscale value, so that a sum of the greyscale value, which is determined for any environmental light intensity based on the positive correlation curve of environmental light intensity and grayscale value, and the first eye protection coefficient, which is determined for the environmental light intensity based on the negative correlation curve of environmental light intensity and first eye protection coefficient, is 1.

In some embodiments, for an environmental light intensity with the environmental light intensity value of 0 Lux, the grayscale value corresponding to the environmental light intensity is 0, then in the negative correlation curve of environmental light intensity and first eye protection coefficient, for the environmental light intensity with the environmental light intensity value of 0 Lux, the first eye protection coefficient corresponding to the environmental light intensity is 1−0=1.

Therefore, the negative correlation curve of environmental light intensity and first eye protection coefficient may be obtained based on the positive correlation curve of environmental light intensity and grayscale value. The schematic diagram of the obtained negative correlation curve of environmental light intensity and first eye protection coefficient is shown by the solid line in FIG. 3.

In this way, the first eye protection coefficient can be adjusted more accurately based on the difference in environmental light intensity, so that the RGB values of all color nodes adjusted based on the first eye protection coefficient meet user needs. In turn, the user's experience and comfort are improved.

In some embodiments of the present disclosure, the eye protection coefficient is determined by the second eye protection coefficient.

The geographic location of the mobile terminal is acquired, and the second eye protection coefficient is determined based on the geographic location.

In some embodiments, the eye protection coefficient is determined by the first eye protection coefficient and the second eye protection coefficient. The eye protection coefficient is a product of the first eye protection coefficient and the second eye protection coefficient.

The eye protection coefficient is determined by the first eye protection coefficient and the second eye protection coefficient, that is, the eye protection coefficient is determined by taking into account both the environmental light intensity and the geographic location of the mobile terminal. Furthermore, based on the preset eye protection value and the eye protection coefficient, an appropriate eye protection value can be given, which improves the user's experience and comfort.

Figure 4:
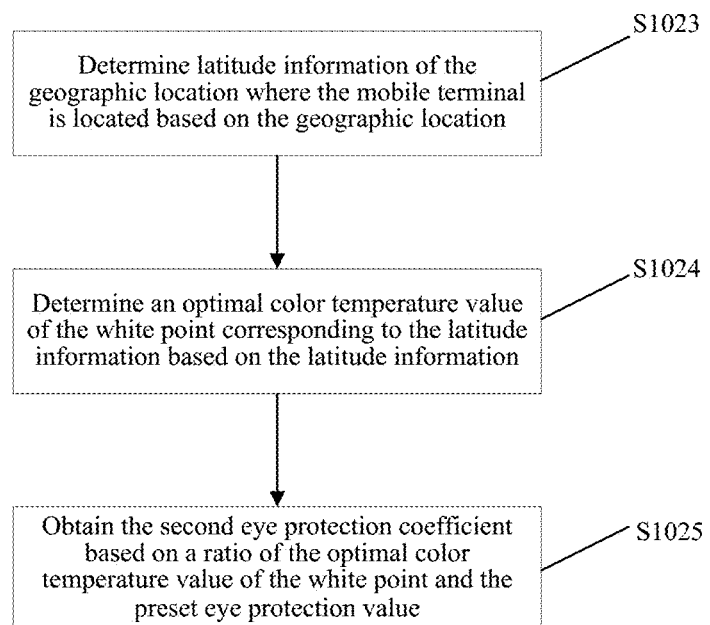
FIG. 4 is a flowchart of determining a second eye protection coefficient in processing method for an eye protection mode according to some embodiments of the present disclosure.

FIG. 4 is a flowchart of determining a second eye protection coefficient in processing method for an eye protection mode according to some embodiments of the present disclosure.

As shown in FIG. 4, in some embodiments of the present disclosure, the second eye protection coefficient is determined based on the geographic location through step S1023, step S1024, and step S1025. The steps S1023, S1024 and S1025 will be introduced below, respectively.

In step S1023, based on the geographic location, latitude information of the geographic location where the mobile terminal is located is determined.

In step S1024, based on the latitude information, an optimal color temperature value of the white point corresponding to the latitude information is determined.

The second eye protection coefficient is determined according to the latitude information of the location where the mobile terminal is located.

At places near the equator, the color temperature value that humans see daily will be higher, because the shorter the wavelength, the easier it is to be absorbed by the air. Compared with high latitude areas, the areas close to the equator has more blue light because the areas are subsolar and the light pass through fewer air layers. Therefore, in the area close to the equator, the optimal color temperature value of the white point is relatively high.

For example, humans in the equatorial areas (the average color temperature value of the white point seen daily is 11000 K, the color temperature value at dusk is 8000 K, and the color temperature value at noon is 17000 K) prefer a higher color temperature value, because in the equatorial areas, a higher color temperature value is more realistic.

Conversely, humans in areas with higher latitudes (the average color temperature value of the white point seen daily is 6000 K) prefer a lower color temperature value.

According to statistics, in the equatorial area, the optimal color temperature of the white point is 7500 K, and in the area north of the Tropic of Cancer, the optimal color temperature of the white point is 5500 K.

Based on the above information, a curve of latitude and optimal color temperature of white point can be fitted. The fitted curve of latitude and optimal color temperature of white point is shown in FIG. 5.

Figure 5:
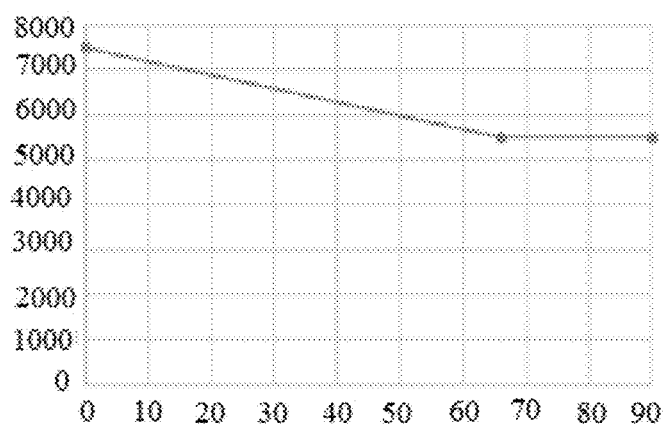
FIG. 5 is a schematic diagram of a curve of latitude and optimal color temperature value of white point determined in a processing method for an eye protection mode according to some embodiments of the present disclosure.

As shown in FIG. 5, with respect to latitudes from the equatorial area to the Tropic of Cancer area, the curve of latitude and optimal color temperature of white point is linearly correlated to the optimal color temperature value of the white point; with respect to latitudes from the Tropic of Cancer area to the North Pole, the curve of latitude and optimal color temperature of white point is a constant function relative to the optimal color temperature value of the white point.

In step S1025, based on a ratio of the preset eye protection value and the optimal color temperature value of the white point, the second eye protection coefficient is obtained.

Based on the latitude of the location of the mobile terminal, the optimal color temperature value y of the white point corresponding to the latitude can be obtained according to the curve of latitude and optimal color temperature of white point.

Assuming that the preset eye protection value set by the user is T, the second eye protection coefficient is obtained based on the ratio of the optimal color temperature value of the white point and the preset eye protection value. That is, the second eye protection coefficient=y/T.

The second eye protection coefficient is used to adjust the eye protection coefficient according to different locations of the mobile terminal, so that the RGB values of all the color nodes adjusted based on the eye protection coefficient more complies with the user's needs, thereby improving the user's experience and comfort.

In some embodiments of the present disclosure, the second eye protection coefficient is determined based on the geographic location by: determining whether the mobile terminal is located within a preset area based on the geographic location of the mobile terminal. If the mobile terminal is located within the preset area, the second eye protection coefficient is of a preset eye protection coefficient value.

For users in some areas where there are special needs for eye protection, the eye protection coefficient needs to be set as a fixed eye protection coefficient value. Therefore, when the mobile terminal is located in these preset areas, the second eye protection coefficient is directly set as the preset eye protection coefficient value.

The second eye protection coefficient is set as the preset eye protection coefficient value when the mobile terminal is located within the preset area, so that the amount of calculation is reduced and the work efficiency is improved on the basis of providing a reasonable eye protection value to the user.

The preset eye protection coefficient value can be adjusted according to actual conditions, and in the present disclosure, the preset eye protection coefficient value is not specifically limited.

In some embodiments, some users in some geographical locations (such as in certain areas in Asia where sunlight is prevalent and some users are more adapted to strong light) may have lower requirements for eye protection, and a specific second eye protection coefficient can be set for these groups of users.

In some embodiments of the present disclosure, the eye protection coefficient is determined by the third eye protection coefficient.

The third eye protection coefficient is determined based on user's habits.

The user's habits are related to the user's age and gender.

When the terminal is set at the factory, based on usage habits of many users, for example, based on the age and gender of users, a recommended third eye protection coefficient value is set for the mobile terminal according to the statistics of the big data.

The third eye protection coefficient value may also be set in the mobile terminal by the user according to his own preferences and habits.

In some embodiments, the usage habits of the user and the age of the user may be counted according to the big data to determine a correspondence between the third eye protection coefficient and the age of the user.

In some embodiments, when the user's age exceeds a certain age (for example, elder than 15 years old), the third eye protection coefficient also increases with age.

In some embodiments, when the user's age is less than a certain age (for example, 15 years old), the younger the age, the larger the third eye protection coefficient.

In some embodiments, the usage habits of the user and the user's gender may be counted according to the big data to determine a correspondence between the third eye protection coefficient and the user's gender.

In some embodiments, since a majority of the female users tend to be more emotional than rational, they prefer pictures with bright colors. Therefore, for the female users, the value of the third eye protection coefficient may be relatively low.

In some embodiments, since a majority of the male users tend to be more rational than emotional, they pay more attention to the factor of eye protection degree of pictures. Therefore, for the male users, the third eye protection coefficient value may be relatively high.

In some embodiments, the eye protection coefficient is determined by the first eye protection coefficient, the second eye protection coefficient, and the third eye protection coefficient. The eye protection coefficient is a product of the first eye protection coefficient, the second eye protection coefficient, and the third eye protection coefficient.

The eye protection coefficient is determined by the first eye protection coefficient, the second eye protection coefficient, and the third eye protection coefficient, so that the eye protection coefficient is determined by considering three factors of environmental light intensity, geographic location of the mobile terminal, and the user's habits simultaneously. Thus, an appropriate eye protection value can be given based on the preset eye protection value and the eye protection coefficient, which improves the user's experience and comfort.

Figure 6:
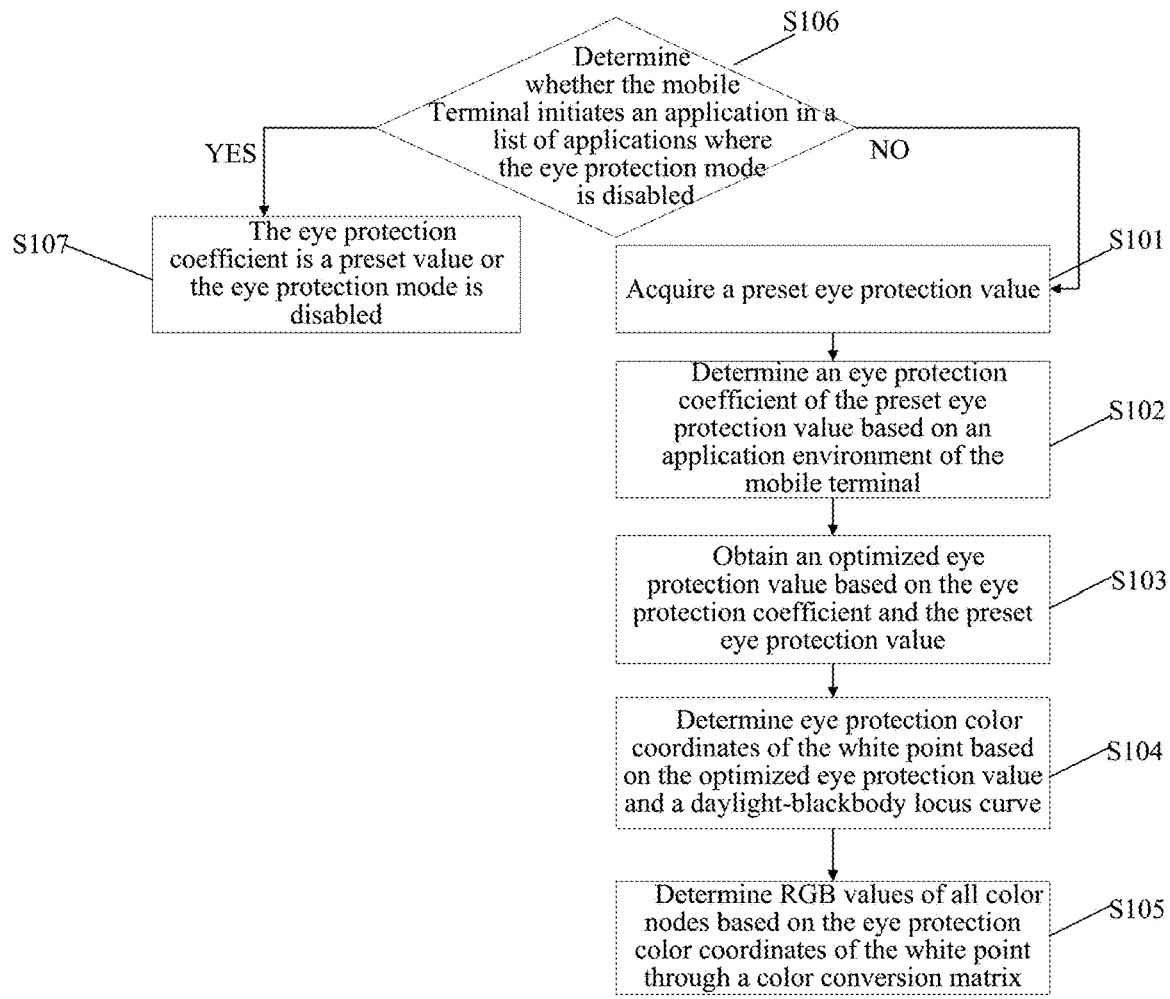
FIG. 6 is a flowchart of another processing method for an eye protection mode according to some embodiments of the present disclosure.

FIG. 6 is a flowchart of another processing method for an eye protection mode according to some embodiments of the present disclosure.

As shown in FIG. 6, in some embodiments of the present disclosure, before the preset eye protection value is acquired in step S101, the processing method for the eye protection mode further includes step S106 and step S107. The steps S106 and S107 will be described in detail below.

In step S106, it is determined whether the mobile terminal initiates an application in a list of applications where the eye protection mode is disabled.

In step S107, when an application in the list of applications with disabled eye protection mode is initiated, the eye protection coefficient is of a preset value or the eye protection mode is disabled.

The eye protection mode is a processing method in which the mobile terminal applies the processing method for an eye protection mode of the present disclosure.

The applications such as photographing, video recording, browsing albums, video calls, beauty cameras, retouching software, and quick pictures require high color reproduction. Therefore, when these applications are initiated, the eye protection mode needs to be disabled, or the eye protection coefficient should be set to a lower value.

In some embodiments, an application that needs to disable the eye protection mode or to set lower eye protection coefficient value may be classified into the above list of applications. When it is detected that the mobile terminal initiates an application in the list, the eye protection mode can be disabled, or the eye protection coefficient is set to have a lower value.

If the mobile terminal does not initiate an application in the list, step S101 is performed (that is, the preset eye protection value is acquired).

Figure 7:
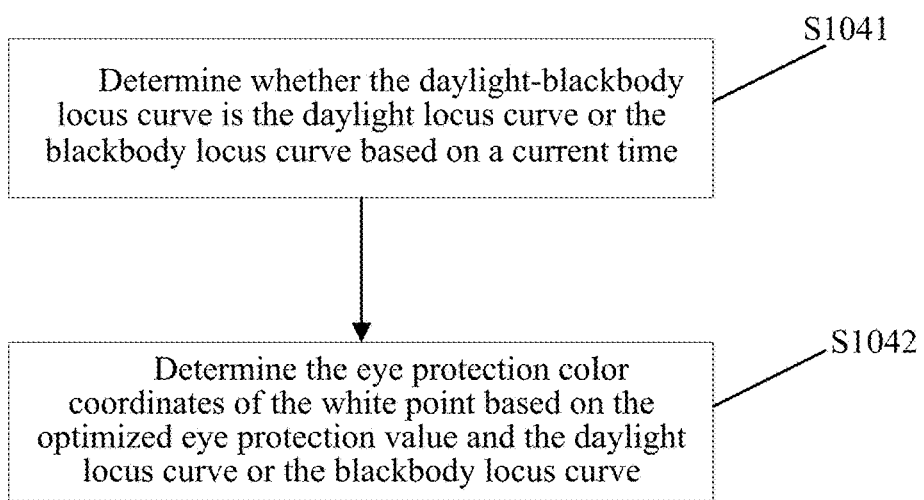
FIG. 7 is a flowchart of determining eye protection color coordinates of a white point in a processing method for an eye protection mode according to some embodiments of the present disclosure.
Figure 8:
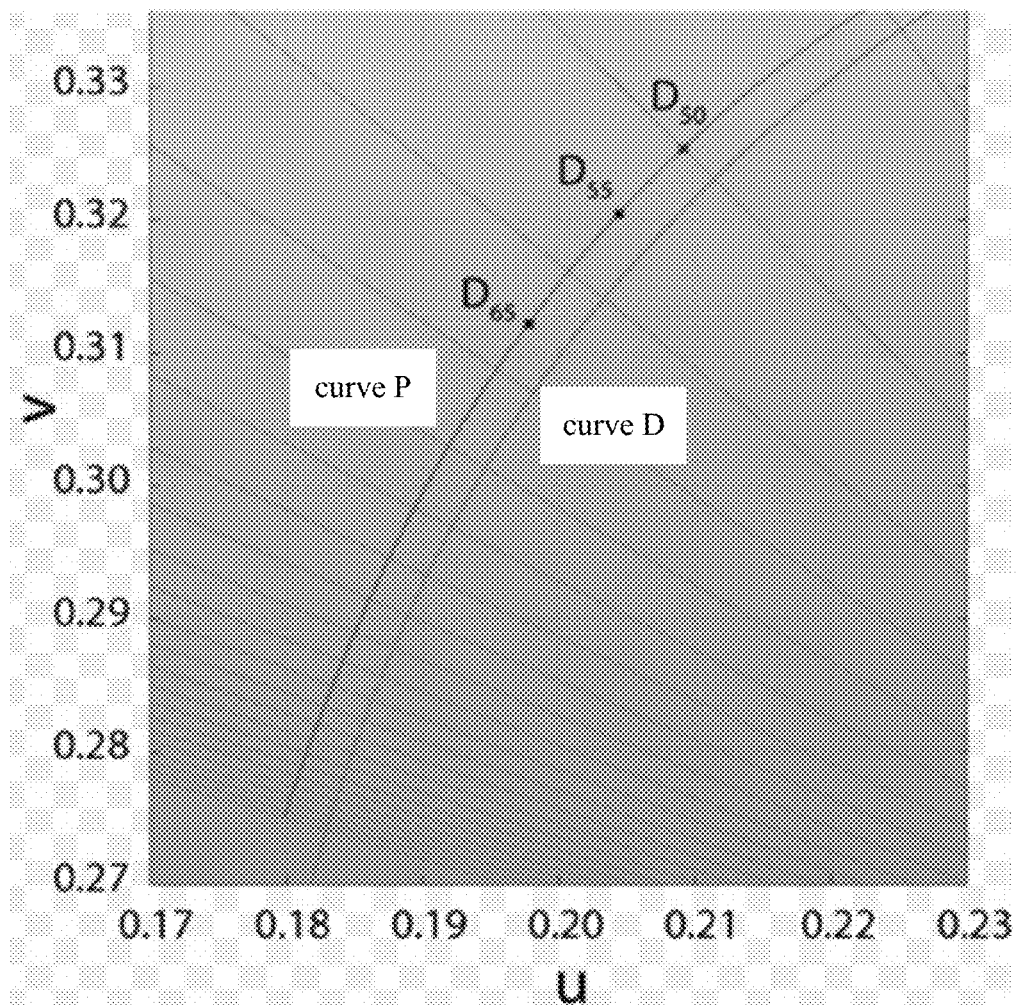
FIG. 8 is a schematic diagram of a daylight-blackbody locus curve involved in a processing method for an eye protection mode according to some embodiments of the present disclosure.

FIG. 7 is a flowchart of determining eye protection color coordinates of a white point in a processing method for an eye protection mode according to some embodiments of the present disclosure, and FIG. 8 is a schematic diagram of a daylight-blackbody locus curve involved in a processing method for an eye protection mode according to some embodiments of the present disclosure.

As shown in FIG. 7, in some embodiments of the present disclosure, the eye protection color coordinates of the white point is determined based on the optimized eye protection value and the daylight-blackbody locus curve through steps S1041 and S1042. The steps S1041 and S1042 will be introduced below, respectively.

The daylight-blackbody locus curve includes a daylight locus curve and a blackbody locus curve.

In step S1041, it is determined whether the daylight-blackbody locus curve is the daylight locus curve or the blackbody locus curve based on the current time.

The current time includes a current date and a current time point.

Based on daily sunrise time and sunset time, a day is divided into daytime and night according to sunrise time and sunset time. In the daytime, the eye protection value of the white point follows the daylight locus curve. The daylight locus curve is shown as curve D in FIG. 8.

The formula of curve D is:

$$Y_D = -3.000(X_D)^2 \pm 2.870 X_D - 0.275$$

if 4000 K $\leq T_{cp} \leq$ 7000 K, $$X_D = -4.6070(10^9/T^3_{cp}) + 2.9678(10^6/T^2_{cp}) + 0.09911 \\ (10^3/T_{cp}) + 0.244063$$

if 7000 K $\leq T_{cp} \leq$ 25000 K, $$X_D = -2.0064(10^9/T^3_{cp}) + 1.9018(10^6/T^2_{cp}) + 0.24748 \\ (10^3/T_{cp}) + 0.237040$$

At night, the eye protection value of the white point follows the blackbody locus curve. The blackbody locus curve is shown as curve P in FIG. 8.

The formula of curve P is:

$$P(\lambda) = (C_1/\lambda^5) \cdot (1/e^{(C2/\lambda T - 1)}) \cdot [W/cm^2 \cdot um)]$$

$$X = \int_{380}^{780} P(\lambda) \bar{x}(\lambda) d\lambda$$

$$Y = \int_{380}^{780} P(\lambda) \bar{y}(\lambda) d\lambda$$

$$Z = \int_{380}^{780} P(\lambda) \bar{z}(\lambda) d\lambda$$

The curve D is more in line with the human's habit of seeing things in the daytime, and the curve P is more in line with the human's habit of seeing things in the night.

In step S1042, based on the optimized eye protection value and either the daylight locus curve or the blackbody locus curve, the eye protection color coordinates of the white point are determined.

If the eye protection value of the white point follows the daylight locus curve, based on the eye protection value, the color coordinates (u, v) of the white point corresponding to the eye protection value can be determined.

$D_{65}$ indicates that the protection value of the white point is the eye color temperature value 6500 K, $D_{55}$ indicates that the protection value of the white point is the eye color temperature value 5500 K, and $D_{50}$ indicates that the protection value of the white point is the eye color temperature value 5000 K. The eye protection color coordinates of the white point with the color temperature value 6500 K, the eye protection color coordinates of the white point with the color temperature value 5500 K, and the eye protection color coordinates of the white point with the color temperature value 5000 K can be read separately through the daylight locus curve.

Figure 9:
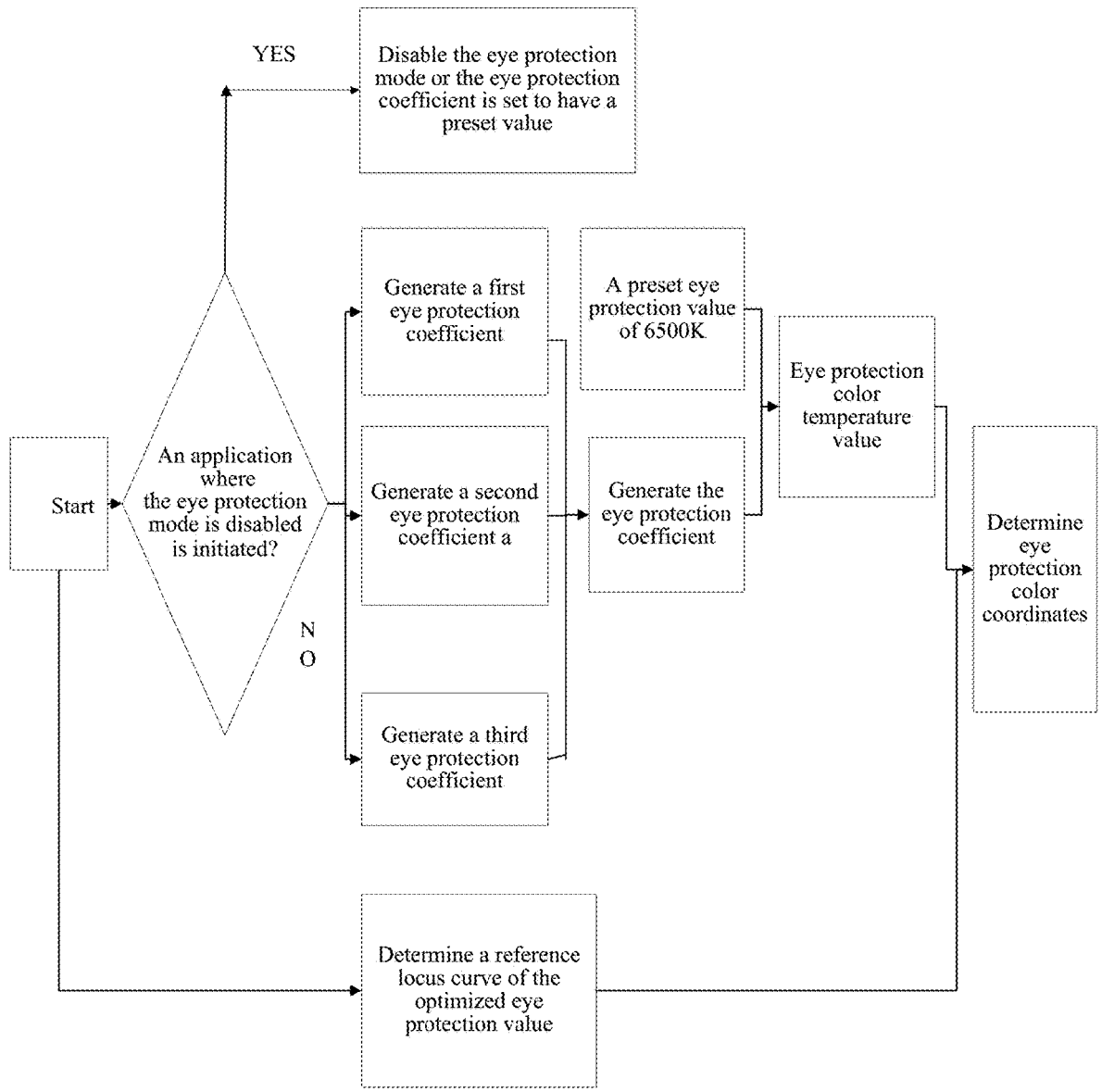
FIG. 9 is a flowchart of another processing method for an eye protection mode according to some embodiments of the present disclosure.

FIG. 9 is a flowchart of another processing method for an eye protection mode according to some embodiments of the present disclosure.

As shown in FIG. 9, the processing method for an eye protection mode of the present disclosure will be described with the following embodiments.

In some embodiments, it is determined whether the mobile terminal initiates an application in a list of applications where the eye protection mode is disabled.

When it is detected that the mobile terminal initiates an application in the list of applications with disabled eye protection mode, the eye protection mode is disabled, or the eye protection coefficient is set to have a lower value.

When it is detected that the mobile terminal does not initiate an application in the list of applications with disabled eye protection mode, the preset eye protection value is obtained, for example, the color temperature value of the white point being 6500 K, and the eye protection coefficient. Based on the eye protection coefficient and the preset eye protection value, the optimized eye protection value, that is, the eye protection color temperature value of the white point, is obtained.

The eye protection coefficient is determined by the first eye protection coefficient, the second eye protection coefficient, and the third eye protection coefficient. The eye protection coefficient is the product of the first eye protection coefficient, the second eye protection coefficient, and the third eye protection coefficient.

The first eye protection coefficient varies according to the environmental light intensity. The first eye protection coefficient has a negative correlation with environmental light intensity. The stronger the environmental light intensity, the smaller the first eye protection coefficient, and the weaker the environmental light intensity, the larger the first eye protection coefficient.

The second eye protection coefficient is determined according to the geographic location of the mobile terminal.

Based on the geographic location of the mobile terminal, the latitude information of the geographic location of the mobile terminal is determined; based on the latitude information, an optimal color temperature value of the white point corresponding to the latitude information is determined; and based on the ratio of the optimal color temperature value of the white point and the preset eye protection value, the second eye protection coefficient is obtained.

The third eye protection coefficient is determined according to the user's age.

Based on the current time, it is determined whether the daylight-blackbody locus curve is the daylight locus curve or the blackbody locus curve.

Based on daily sunrise time and sunset time, the day is divided into daytime and night according to sunrise time and sunset time. In the daytime, the eye protection value of the white point follows the daylight locus curve. At night, the eye protection value of the white point follows the blackbody locus curve.

Based on the optimized eye protection value as well as either the daylight locus curve or the blackbody locus curve, the eye protection color coordinates of the white point are determined.

Based on the same concept, the embodiments of the present disclosure further provide a processing device for an eye protection mode.

It can be understood that, in order to realize the above-mentioned functions, the processing device for an eye protection mode provided by the embodiments of the present disclosure includes a hardware structure and/or a software module corresponding to each function. In conjunction with the exemplary units and algorithm steps disclosed in the embodiments of the present disclosure, the embodiments of the present disclosure can be carried out by the hardware or a combination of the hardware and the computer software. Whether the functions are implemented by hardware or computer software driving the hardware depends on particular applications and design constraints of the technical solutions. For each of the particular applications, a person skilled in the art can use different methods to implement the described functions, but such implementation should not be considered as beyond the scope of the present disclosure.

Figure 10:
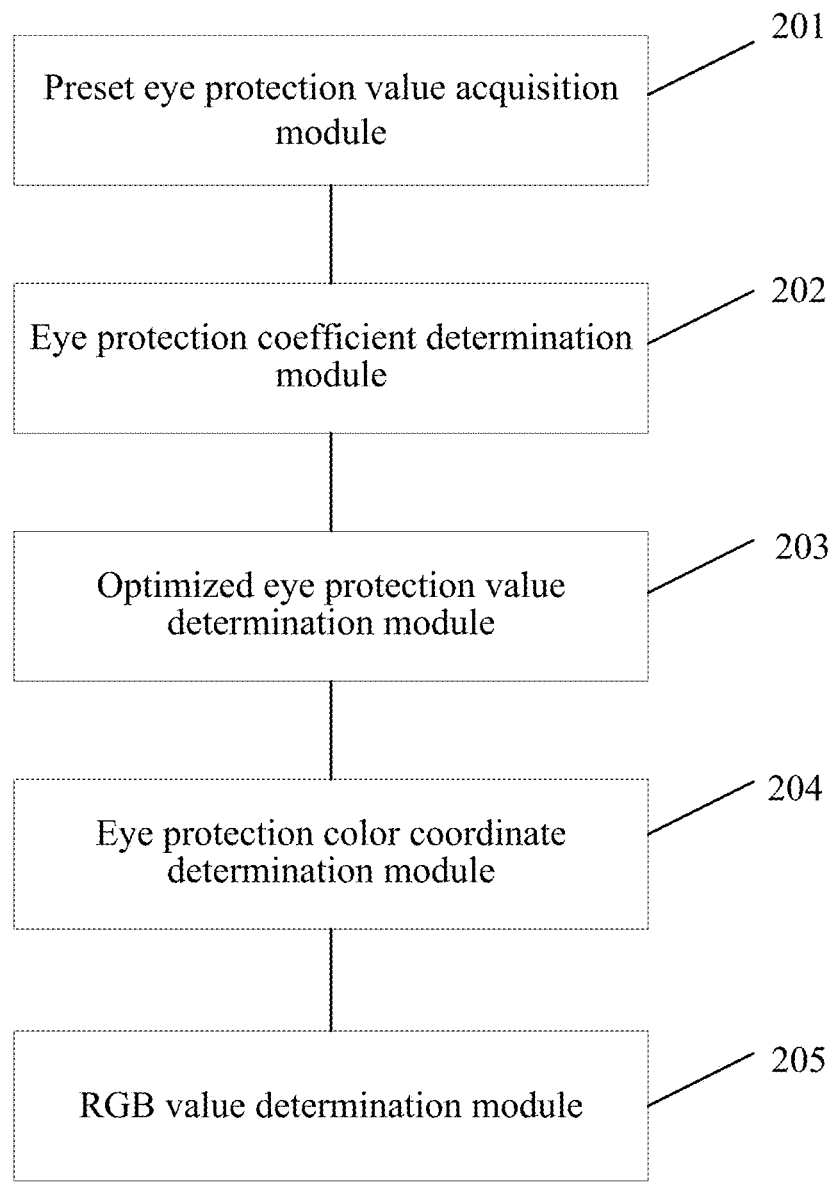
FIG. 10 is a block diagram of a processing device for an eye protection mode according to some embodiments of the present disclosure.

FIG. 10 is a block diagram of a processing device for an eye protection mode according to some embodiments of the present disclosure. As shown in FIG. 10, the processing device for the eye protection mode includes: a preset eye protection value acquisition module 201, an eye protection coefficient determination module 202, an optimized eye protection value determination module 203, an eye protection color coordinate determination module 204, and an RGB value determination module 205. The following describes each module.

The preset eye protection value acquisition module 201 is configured to acquire a preset eye protection value, the preset eye protection value being a preset color temperature value of a white point.

The eye protection coefficient determination module 202 is configured to determine an eye protection coefficient of the preset eye protection value based on an application environment of the mobile terminal.

The optimized eye protection value determination module 203 is configured to get an optimized eye protection value based on the eye protection coefficient and the preset eye protection value, the optimized eye protection value being an eye protection color temperature value of the white point.

The eye protection color coordinate determination module 204 is configured to determine eye protection color coordinates of the white point based on the optimized eye protection value and a daylight-blackbody locus curve.

The RGB value determination module 205 is configured to determine RGB values of all color nodes based on the eye protection color coordinates of the white point through a color conversion matrix.

In some embodiments of the present disclosure, the eye protection coefficient includes one or any combination of the following: a first eye protection coefficient, a second eye protection coefficient, and a third eye protection coefficient.

In some embodiments of the present disclosure, the eye protection coefficient determination module 202 is configured to: determine the first eye protection coefficient based on environmental light intensity, and the first eye protection coefficient is negatively correlated to the environmental light intensity.

In some embodiments of the present disclosure, the eye protection coefficient determination module 202 is configured to: determine a negative correlation curve of environmental light intensity and first eye protection coefficient through a conversion relationship based on a positive correlation curve of environmental light intensity and grayscale value; and determine the first eye protection coefficient corresponding to the environmental light intensity based on the environmental light intensity and the negative correlation curve of environmental light intensity and first eye protection coefficient.

In some embodiments of the present disclosure, the eye protection coefficient determination module 202 is configured to: acquire different environmental light intensity values and grayscale values corresponding to the environmental light intensity values, to fit a positive correlation curve of environmental light intensity and grayscale value, where the image displayed on the terminal has at least four gray levels; acquire the negative correlation curve of environmental light intensity and first eye protection coefficient based on the positive correlation curve of environmental light intensity and grayscale value, so that a sum of a grayscale value, which is determined for any environmental light intensity based on the positive correlation curve of environmental light intensity and grayscale value, and the first eye protection coefficient, which is determined for the environmental light intensity based on the negative correlation curve of environmental light intensity and first eye protection coefficient, is 1.

In some embodiments of the present disclosure, the eye protection coefficient determination module 202 is configured to: acquire a geographic location of the mobile terminal, and determine the second eye protection coefficient based on the geographic location.

In some embodiments of the present disclosure, the eye protection coefficient determination module 202 is configured to: determine latitude information of the geographic location where the mobile terminal is located based on the geographic location; determine an optimal color temperature value of the white point corresponding to the latitude information based on the latitude information; and acquire the second eye protection coefficient based on a ratio of the optimal color temperature value of the white point and the preset eye protection value.

In some embodiments of the present disclosure, the eye protection coefficient determination module 202 is configured to: determine whether the mobile terminal is located within a preset area based on the geographic location of the mobile terminal; and determine that the second eye protection coefficient is a preset eye protection coefficient value when the mobile terminal is located within the preset area.

In some embodiments of the present disclosure, the eye protection coefficient determination module 202 is configured to: determine the third eye protection coefficient based on user's habits.

In some embodiments of the present disclosure, the preset eye protection value acquisition module 201 is also configured to: determine whether the mobile terminal initiates an application in a list of applications where the eye protection mode is disabled; determine that the eye protection coefficient has a preset value or disable the eye protection mode if an application in the list is initiated; and acquire the preset eye protection value if an application in the list is not initiated.

In some embodiments of the present disclosure, the daylight-blackbody locus curve includes a daylight locus curve and a blackbody locus curve. The eye protection color coordinate determination module 204 is configured to: determine whether the daylight-blackbody locus curve is the daylight locus curve or the blackbody locus curve based on a current time, while the current time includes a current date and a current time point; and determine the eye protection color coordinates of the white point based on the optimized eye protection value and either the daylight locus curve or the blackbody locus curve.

Regarding the device in the above embodiments, the specific manner in which each module performs operations has been described in detail in the embodiment related to the method, and will not be elaborated here.

Figure 11:
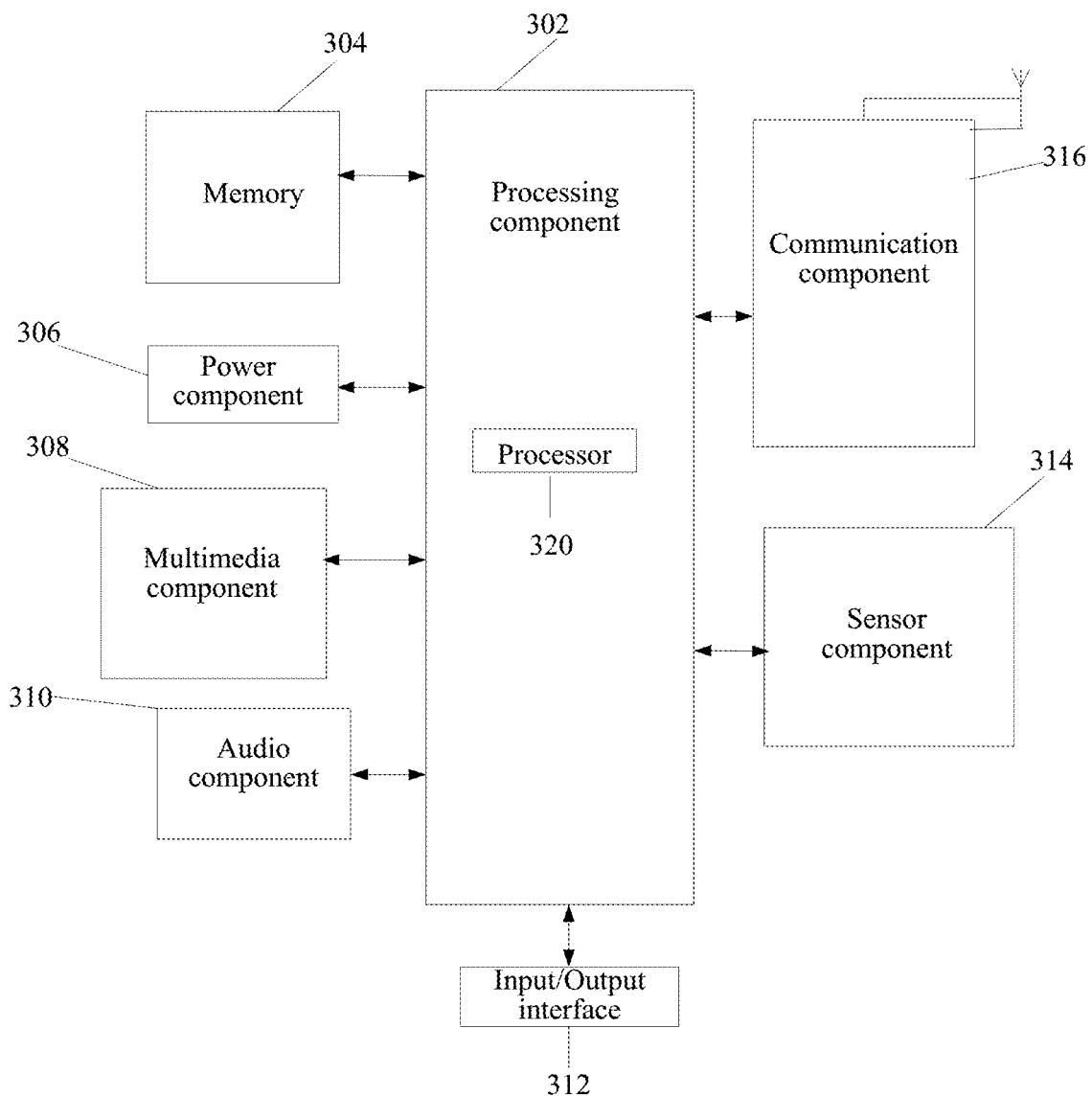
FIG. 11 is a block diagram of a processing device for an eye protection mode according to some embodiments of the present disclosure.

FIG. 11 is a block diagram of a processing device for an eye protection mode according to some embodiments of the present disclosure. For example, the processing device for an eye protection mode may be a mobile phone, a computer, a digital broadcasting terminal, a messaging device, a game console, a tablet device, a medical device, a fitness device, a personal digital assistant, and so on.

Referring to FIG. 11, the processing device for the eye protection mode may include one or more of the following components: a processing component 302, a memory 304, a power component 306, a multimedia component 308, an audio component 310, an input/output (I/O) interface 312, a sensor component 314, and a communication component 316.

The processing component 302 typically controls the overall operations of the device, such as the operations associated with display, telephone calls, data communications, camera operations, and recording operations. The processing component 302 can include one or more processors 320 to execute instructions to perform all or part of the steps in the above described methods. Moreover, the processing component 302 can include one or more modules to facilitate the interaction between the processing component 302 and other components. For example, the processing component 302 can include a multimedia module to facilitate the interaction between the multimedia component 308 and the processing component 302.

The memory 304 is configured to store various types of data to support the operation of the device. Examples of such data include instructions for any application or method operated on device, such as the contact data, the phone book data, messages, pictures, videos, and the like. The memory 304 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device. The power component 306 can include a power management system, one or more power sources, and other components associated with the generation, management, and distribution of power in the device.

The multimedia component 308 includes a screen providing an output interface between the device and the user. In some embodiments, the screen can include a liquid crystal display (LCD) and a touch panel (TP). In some embodiments, organic light-emitting diode (OLED) displays or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. When the device is in an operation mode, such as a photographing mode or a video mode, the front camera and/or the rear camera can receive external multimedia datum. Each of the front camera and the rear camera may be a fixed optical lens system or have focus and optical zoom capability.

The audio component 310 is configured to output and/or input an audio signal. For example, the audio component 310 includes a microphone (MIC) configured to receive an external audio signal when the device is in an operation mode, such as a call mode, a recording mode, and a voice recognition mode. The received audio signal may be further stored in the memory 304 or sent via the communication component 316. In some embodiments, the audio component 310 also includes a speaker for outputting the audio signal.

The I/O interface 312 provides an interface between the processing component 302 and peripheral interface modules, such as a keyboard, a click wheel, buttons, and the like. These buttons may include, but are not limited to, a home button, a volume button, a starting button, and a locking button.

The sensor component 314 includes one or more sensors for providing status assessments of various aspects of the device. For example, the sensor component 314 can detect an open/closed status of the device, relative positioning of components, such as the display and the keypad of the device. The sensor component 314 can also detect a change in position of one component of the device or the device, the presence or absence of user contact with the device, an orientation, or an acceleration/deceleration of the device, and a change in temperature of the device. The sensor component 314 can include a proximity sensor configured to detect the presence of nearby objects without any physical contact. The sensor component 314 can also include a light sensor, such as a CMOS or CCD image sensor, configured to use in imaging applications. In some embodiments, the sensor component 314 can also include an accelerometer sensor, a gyroscope sensor, a magnetic sensor, a pressure sensor, or a temperature sensor.

The communication component 316 is configured to facilitate wired or wireless communication between the device and other devices. The processing device for an eye protection mode can access a wireless network based on a communication standard, such as Wi-Fi, 2G, 3G, 4G, 5G, or a combination thereof. In some embodiments, the communication component 316 receives broadcast signals or broadcast associated information from an external broadcast management system via a broadcast channel. In some embodiments, the communication component 316 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the device may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components.

In some embodiments, there is also provided a non-transitory computer-readable storage medium including instructions, such as a memory 304 including instructions executable by the processor 320 of the device to perform the above described method. For example, the non-transitory computer readable storage medium may be a ROM, a random-access memory (RAM), a CD-ROM, a magnetic tape, a floppy disc, and an optical data storage device.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A processing method for an eye protection mode, applied to a mobile terminal and comprising:

acquiring a preset eye protection value, wherein the preset eye protection value is a preset color temperature value of a white point;

determining an eye protection coefficient of the preset eye protection value based on an application environment of the mobile terminal, and obtaining an optimized eye protection value based on the eye protection coefficient and the preset eye protection value, wherein the optimized eye protection value is an eye protection color temperature value of the white point;

determining eye protection color coordinates of the white point based on the optimized eye protection value and a daylight-blackbody locus curve; and determining, based on the eye protection color coordinates of the white point, RGB values of all color nodes through a color conversion matrix;

wherein the eye protection coefficient comprises at least one of a first eye protection coefficient, a second eye protection coefficient, and a third eye protection coefficient, and the first eye protection coefficient is determined based on an environmental light intensity, and the first eye protection coefficient is negatively correlated to the environmental light intensity;

wherein the first eye protection coefficient is determined based on the environmental light intensity by:

determining a negative correlation curve of environmental light intensities and first eye protection coefficients through a conversion relationship based on a positive correlation curve of environmental light intensities and grayscale values; and determining the first eye protection coefficient corresponding to the environmental light intensity based on the environmental light intensity and the negative correlation curve of environmental light intensities and first eye protection coefficients;

wherein the determining a negative correlation curve of environmental light intensities and first eye protection coefficients through a conversion relationship based on a positive correlation curve of environmental light intensities and grayscale values comprises:

acquiring different environmental light intensity values and grayscale values corresponding to the environmental light intensity values, and fitting the positive correlation curve of environmental light intensities and grayscale values, wherein an image displayed on the terminal has at least four gray levels; and acquiring the negative correlation curve of environmental light intensities and first eye protection coefficients based on the positive correlation curve of environmental light intensities and grayscale values, so that a sum of the grayscale values, which is determined for any environmental light intensity based on the positive correlation curve of environmental light intensities and grayscale values, and the first eye protection coefficient, which is determined for the environmental light intensity based on the negative correlation curve of environmental light intensities and first eye protection coefficients, is 1.

2. The method according to claim 1, wherein a geographic location of the mobile terminal is acquired, and the second eye protection coefficient is determined based on the geographic location, wherein the second eye protection coefficient is determined based on the geographic location by:
   determining latitude information of the geographic location where the mobile terminal is located based on the geographic location;
   determining an optimal color temperature value of the white point corresponding to the latitude information based on the latitude information and a curve of latitude and optimal color temperature of white point; and
   obtaining the second eye protection coefficient based on a ratio of the optimal color temperature value of the white point and the preset eye protection value.

3. The method according to claim 1, wherein a geographic location of the mobile terminal is acquired, and the second eye protection coefficient is determined based on the geographic location by:
   determining whether the mobile terminal is located within a preset area based on the geographic location of the mobile terminal, and determining that the second eye protection coefficient is a preset eye protection coefficient value when the mobile terminal is located within the preset area.

4. The method according to claim 1, wherein the third eye protection coefficient is determined based on at least one of user's age and gender.

5. The method according to claim 1, wherein prior to the acquiring a preset eye protection value, the method further comprises:
   determining whether the mobile terminal initiates an application in a list of applications where an eye protection mode is disabled;
   determining that the eye protection coefficient is a preset value or disabling the eye protection mode when an application in the list of applications with disabled eye protection mode is initiated; and
   proceeding to the step of acquiring a preset eye protection value when an application in the list of applications with disabled eye protection mode is not initiated.

6. The method according to claim 1, wherein the determining eye protection color coordinates of the white point based on the optimized eye protection value and a daylight-blackbody locus curve comprises:
   the daylight-blackbody locus curve comprising a daylight locus curve and a blackbody locus curve;
   determining whether the daylight-blackbody locus curve is the daylight locus curve or the blackbody locus curve based on a current time, wherein the current time comprises a current date and a current time point;
   determining the eye protection color coordinates of the white point based on the optimized eye protection value and the daylight locus curve when the current time is during daytime; and
   determining the eye protection color coordinates of the white point based on the optimized eye protection value and the blackbody locus curve when the current time is during night.

7. A processing device for an eye protection mode, applied to a mobile terminal and comprising a processor and a storage device for storing computer-executable instructions that, when executed by the processor, cause the processor to:
   acquire a preset eye protection value, wherein the preset eye protection value is a preset color temperature value of a white point;
   determine an eye protection coefficient of the preset eye protection value based on an application environment of the mobile terminal;
   obtain an optimized eye protection value based on the eye protection coefficient and the preset eye protection value, wherein the optimized eye protection value is an eye protection color temperature value of the white point;
   determine eye protection color coordinates of the white point based on the optimized eye protection value and a daylight-blackbody locus curve; and
   determine RGB values of all color nodes based on the eye protection color coordinates of the white point through a color conversion matrix;
   wherein the eye protection coefficient comprises at least one of a first eye protection coefficient, a second eye protection coefficient, and a third eye protection coefficient, and the first eye protection coefficient is determined based on an environmental light intensity, and the first eye protection coefficient is negatively correlated to the environmental light intensity;
   wherein the processor is further configured to: determine the first eye protection coefficient based on the environmental light intensity by:
   determining a negative correlation curve of environmental light intensities and first eye protection coefficients through a conversion relationship based on a positive correlation curve of environmental light intensities and grayscale values; and
   determining the first eye protection coefficient corresponding to the environmental light intensity based on the environmental light intensity and the negative correlation curve of environmental light intensities and first eye protection coefficients;
   wherein the determining a negative correlation curve of environmental light intensities and first eye protection coefficients through a conversion relationship based on a positive correlation curve of environmental light intensities and grayscale values comprises:
   acquiring different environmental light intensity values and grayscale values corresponding to the environmental light intensity values, and fitting the positive correlation curve of environmental light intensities and grayscale values, wherein an image displayed on the terminal has at least four gray levels; and
   acquiring the negative correlation curve of environmental light intensities and first eye protection coefficients based on the positive correlation curve of environmental light intensities and grayscale values, so that a sum of the grayscale values, which is determined for any environmental light intensity based on the positive correlation curve of environmental light intensities and grayscale values, and the first eye protection coefficient, which is determined for the environmental light intensity based on the negative correlation curve of environmental light intensities and first eye protection coefficients, is 1.

8. The device according to claim 7, wherein the processor is further configured to: acquire a geographic location of the mobile terminal, and determine the second eye protection coefficient based on the geographic location;
   wherein the processor is further configured to:

determine latitude information of the geographic location where the mobile terminal is located based on the geographic location;

determine an optimal color temperature value of the white point corresponding to the latitude information based on the latitude information and a curve of latitude and optimal color temperature of white point; and obtain the second eye protection coefficient based on a ratio of the optimal color temperature value of the white point and the preset eye protection value.

9. The device according to claim 7, wherein the processor is further configured to: acquire a geographic location of the mobile terminal, and determine the second eye protection coefficient based on the geographic location by:

determining whether the mobile terminal is located within a preset area based on the geographic location of the mobile terminal; and determine that the second eye protection coefficient is a preset eye protection coefficient value when the mobile terminal is located within the preset area.

10. The device according to claim 7, wherein the processor is further configured to: determine the third eye protection coefficient based on at least one of user's age and gender.

11. The device according to claim 7, wherein the processor is further configured to:

determine whether the mobile terminal initiates an application in a list of applications with disabled eye protection mode;

determine that the eye protection coefficient is a preset value or disable the eye protection mode when an application in the list of applications with disabled eye protection mode is initiated; and proceed to the step of acquiring a preset eye protection value if an application in the list of applications with disabled eye protection mode is not initiated.

12. The device according to claim 7, wherein the daylight-blackbody locus curve comprises a daylight locus curve and a blackbody locus curve;

wherein the processor is configured to: determine whether the daylight-blackbody locus curve is the daylight locus curve or the blackbody locus curve based on a current time, wherein the current time comprises a current date and a current time point;

determine the eye protection color coordinates of the white point based on the optimized eye protection value and the daylight locus curve when the current time is during daytime; and determine the eye protection color coordinates of the white point based on the optimized eye protection value and the blackbody locus curve when the current time is during the night.

13. A mobile terminal implementing the method according to claim 1, comprising a display screen, wherein the mobile terminal is configured to automatically adjust an image displayed on the display screen according to the optimized eye protection value adapted to a plurality of conditions, wherein the optimized eye protection value is obtained based on the eye protection coefficient and the preset eye protection value.

* * * * *